United States Patent [19]
Bathon et al.

[11] Patent Number: 5,662,350
[45] Date of Patent: Sep. 2, 1997

[54] ATTACHMENT OF AN AIR BAG MODULE WITHIN AN INSTRUMENT PANEL

[75] Inventors: Michael Bathon, Stockstadt; Jürgen Zang, Grossostheim; Franz-Xaver Weiss, Aschaffenburg, all of Germany

[73] Assignee: MST Automotive GmbH, Aschaffenburg, Germany

[21] Appl. No.: 581,712

[22] Filed: Dec. 29, 1995

[30] Foreign Application Priority Data

Dec. 29, 1994 [DE] Germany ............... 44 47 045.2

[51] Int. Cl.⁶ ........................................ B60R 21/20
[52] U.S. Cl. ................ 280/728.2; 280/732; 411/373; 411/508
[58] Field of Search ................. 280/728.2, 732, 280/730.1, 728.1, 731; 411/373, 377, 374, 508

[56] References Cited

U.S. PATENT DOCUMENTS

| | | | |
|---|---|---|---|
| 3,770,036 | 11/1973 | Sherman | 411/508 |
| 4,952,107 | 8/1990 | Dupree | 411/508 |
| 5,364,124 | 11/1994 | Donegan et al. | |
| 5,380,037 | 1/1995 | Worrell et al. | 280/728.2 |
| 5,419,583 | 5/1995 | Sakakida et al. | 280/728.2 |
| 5,489,116 | 2/1996 | Boag | 280/728.2 |

FOREIGN PATENT DOCUMENTS

| | | | |
|---|---|---|---|
| 520 537 | 12/1992 | European Pat. Off. | 280/728.2 |
| 619 204 | 10/1994 | European Pat. Off. | 280/728.2 |

*Primary Examiner*—Brian L. Johnson
*Assistant Examiner*—Peter C. English
*Attorney, Agent, or Firm*—Sprung Horn Kramer & Woods

[57] ABSTRACT

On the passenger side of a motor vehicle an air bag module is inserted in the instrument panel and is connected with a support stationarily disposed behind the aperture by holding plates, where at the upper holding plate at least one mounting bolt is disposed, which is engaged in a corresponding through hole of the support, and the mounting bolt has a recess and is coated with a plastic layer.

8 Claims, 1 Drawing Sheet

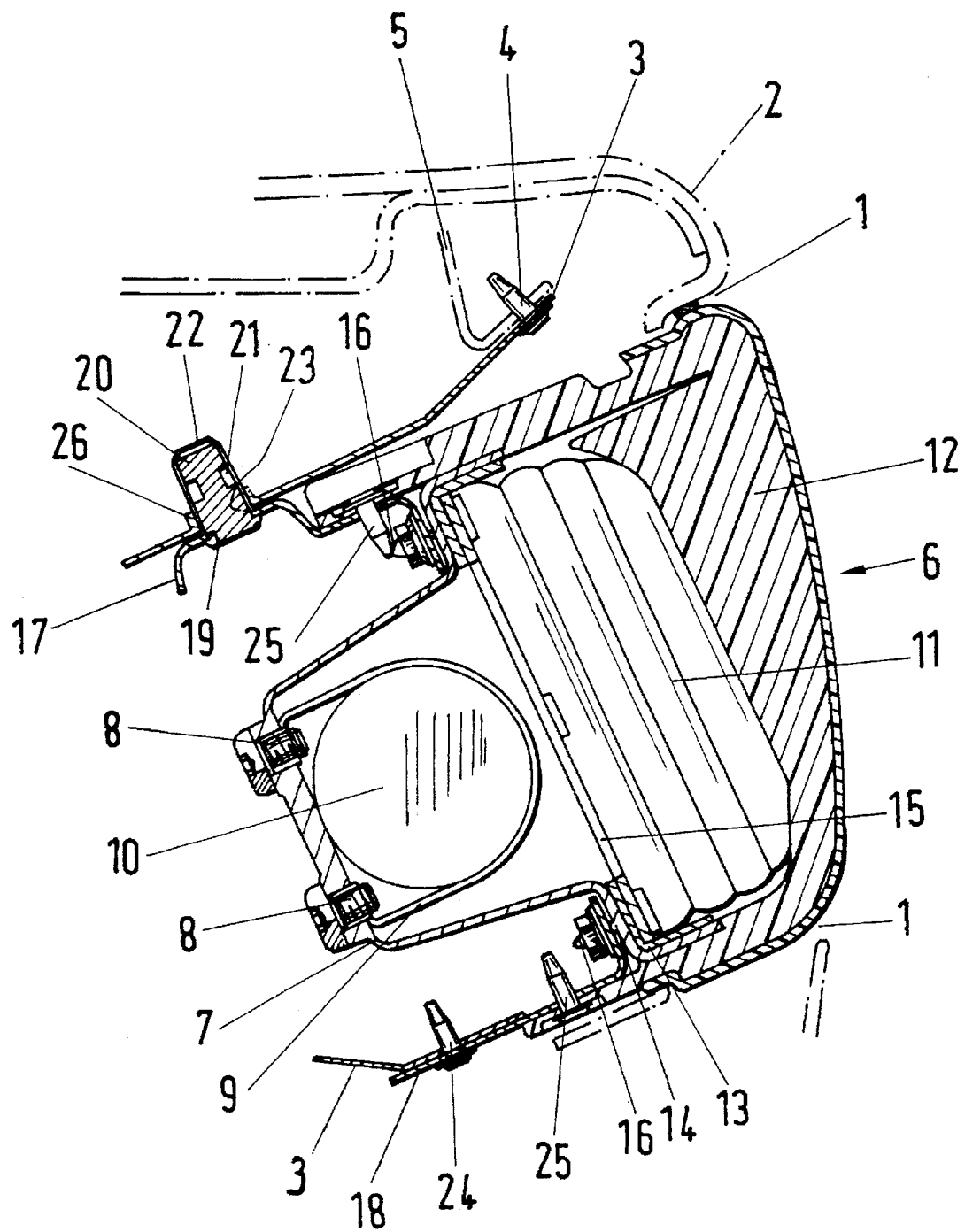

ATTACHMENT OF AN AIR BAG MODULE WITHIN AN INSTRUMENT PANEL

BACKGROUND OF THE INVENTION

This invention relates to the attachment of an air bag module, which on the passenger side of a motor vehicle is inserted in a correspondingly designed aperture of the instrument panel and is connected with a support, preferably a sheet metal frame, stationarily mounted behind the aperture, in which air bag module a holding plate connected with the stationary support is attached to that section of the outer flange of the inflator support which extends transverse to the vehicle axis and points in upward and downward direction, where on the upper holding plate at least one mounting bolt is disposed, which is engaged in a corresponding through hole of the stationary support, and the lower holding plate is connected with the stationary support by means of screws.

Such an attachment of an air bag module on the passenger side of a motor vehicle is now common practice, as such a connection provides for a relatively quick and easy mounting of the air bag module (EP-A-0 619 204). It is, however, disadvantageous that in the case of an activation of the air bag module high forces of gravity are produced, which through the connection of the gas bag with the inflator support and the holding plates exert a high load on the connection of the holding plates with the stationary support, so that the mounting bolt connected with the upwardly pointing holding plate is disengaged from the through hole of the support and can drop into the passenger compartment, which may cause injuries of the vehicle occupant on the passenger side.

SUMMARY OF THE INVENTION

It is the object of the present invention to develop the above-described attachment of an air bag module on the passenger side of a motor vehicle such that the mounting bolt fixed to the upwardly pointing holding plate is definitely prevented from being disengaged from the through hole of the stationary support.

The solution of this object consists in that the mounting bolt comprises a recess and is coated with a thin-walled plastic sheathing. When forces of gravity are acting on the mounting bolt as a result of the activation of the air bag module, the plastic sheathing is destroyed by the edge of the through hole of the stationary support, and the mounting bolt gets caught with its recess at the edge of the through hole. It is thus ensured that the air bag module cannot come loose from its upper attachment and drop into the passenger compartment.

The recess of the mounting bolt preferably consists of an annular groove.

In accordance with a further embodiment, the mounting bolt is provided with two opposed transverse grooves extending perpendicularly to the axis of the mounting bolt, with which grooves the mounting bolt gets caught at the edge of the through hole.

In accordance with this embodiment of the invention, the plastic sheathing preferably shrunk onto the mounting bolt has a thickness of 0.5 to 1.5 mm.

In order to achieve that the mounting bolt is sufficiently guided when it is engaged in the through hole of the stationary support, the through hole expediently has an edge which is raised in direction of engagement.

This invention will subsequently be described by way of example and in greater detail with reference to the attached drawing, wherein

BRIEF DESCRIPTION OF THE DRAWING

The FIGURE is a longitudinal section, which is shown parallel to the plane the extends vertically through the vehicle axis.

DETAILED DESCRIPTION OF THE INVENTION

Behind the aperture 1 of the instrument panel 2 of a passenger car not represented, a sheet metal frame 3 serving as support is firmly connected with the body 5 by means of screws 4. In the aperture 1 of the instrument panel 2 an air bag module 6 is inserted, comprising an inflator support 7 of sheet metal deep-drawn in the form of a rectangle, a tubular inflator 10 held by a clamp strap 9 which is fixed at the bottom of the inflator support by means of screws 8, a folded gas bag 11 disposed above the inflator 10, and a cover 12 made of an elastic plastic material and surrounding said gas bag like a hood. The outer contour of the air bag module 6 is adapted to the geometry of the instrument panel 2. The edge 13 of the gas inlet opening of the gas bag 11 is clamped between the front side of the angular flange 14 of the inflator support 7 and a locking plate 15 by means of screws 16 extending through corresponding holes in the locking plate 15, the gas bag 11 and the flange 14 of the inflator support 7. Between the nuts of the screws 16 and the rear of the angular flange 14 of the inflator support 7 holding plates 17, 18 are clamped, which are bent towards the inflator support 7. A mounting bolt 20, which in its upper portion is provided with an annular groove 21 and is surrounded by a plastic layer 22 made of poly-oxy-methylene, is fixed in a through hole 19 of the upper holding plate 17. The mounting bolt 20 is engaged in a through hole 23 of the sheet metal frame 3. The lower holding plate 18 is connected with the sheet metal frame 3 by means of screws 24. The edge of the plastic cover 12 for the gas bag 11 on the side of the vehicle is fixed at the holding plates 17, 18 by means of screws 25. The edge 26 of the through hole 23 is raised in the direction of engagement of the mounting bolt 20.

Upon activation of the air bag module 6 And the resulting high load acting on the mounting bolt 20, the same gets caught with its annular groove 21 in the raised edge 26 of the through hole 23 of the sheet metal frame 3, where the raised edge destroys the plastic sheathing 22 of the mounting bolt 20 during such disengagement.

What is claimed is:

1. An attachment of an air bag module, which on the passenger side of a motor vehicle is inserted in a correspondingly designed aperture of an instrument panel and is connected with a support stationarily disposed behind the aperture, where on a section of a flange of an inflator support extending transverse to a vehicle axis and upper and lower holding plates pointing in upward and downward directions are fixed, which are each connected with the stationary support, where on the upper holding plate at least one mounting bolt is disposed, which is engaged in a corresponding through hole of the support having a raised edge, and the lower holding plate is connected with the stationary support by screws, wherein the mounting bolt has a recess and is surrounded by a plastic layer and wherein the raised edge destroys the plastic layer and gets caught in the recess upon disengagement after actuation of the air bag module.

2. The attachment as claimed in claim 1, wherein the recess comprises an annular groove.

3. The attachment as claimed in claim 1, wherein the recess comprises two opposed transverse grooves extending perpendicularly to the axis of the mounting bolt.

4. The attachment as claimed in claim 1, wherein the thickness of the plastic layer is 0.5 to 1.5 mm.

5. In a mounting for an air bag module mountable in an instrument panel, wherein an upper holding plate is connected to a stationary support, the improvement comprising at least one aperture in the holding plate, at least one aperture in the support having an upwardly extending edge and at least one mounting bolt having a plastic cover and inserted upwardly through the apertures, wherein the at least one mounting bolt has at least one recess at an upper portion thereof, wherein the upwardly extending edge destroys the plastic cover and gets caught in the at least one recess upon disengagement after activation of the air bag module.

6. The mounting according to claim 5, wherein the plastic cover has a thickness of from 0.5 to 1.5 mm.

7. The mounting according to claim 5, wherein the at least one recess is at least one annular groove.

8. The mounting according to claim 5, wherein the at least one recess is two opposed transverse grooves extending perpendicularly to an axis of the mounting bolt.

\* \* \* \* \*